United States Patent
Thompson et al.

(10) Patent No.: US 10,557,024 B2
(45) Date of Patent: Feb. 11, 2020

(54) SUSTAINABLE INJECTION MOLDED ARTICLES

(71) Applicant: Kimberly-Clark Worldwide, Inc., Neenah, WI (US)

(72) Inventors: Brent Merrik Thompson, Oshkosh, WI (US); James Hongxue Wang, Appleton, WI (US); Gregory James Wideman, Menasha, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 935 days.

(21) Appl. No.: 14/138,325

(22) Filed: Dec. 23, 2013

(65) Prior Publication Data

US 2015/0037524 A1    Feb. 5, 2015

Related U.S. Application Data

(60) Provisional application No. 61/860,577, filed on Jul. 31, 2013.

(51) Int. Cl.
  *C08L 23/12* (2006.01)
  *B29C 45/18* (2006.01)
  *B29K 105/26* (2006.01)
  *B29C 45/00* (2006.01)

(52) U.S. Cl.
  CPC .......... *C08L 23/12* (2013.01); *B29C 45/1816* (2013.01); *B29C 45/0001* (2013.01); *B29K 2105/26* (2013.01); *Y10T 428/1352* (2015.01); *Y10T 428/2495* (2015.01);

(Continued)

(58) Field of Classification Search
  CPC .......... C08L 23/12; C08L 101/00; C08L 3/22; C08L 3/20; C08L 17/00; B29C 45/1816; B29C 45/0001; Y10T 428/1352; Y10T 428/2495; Y10T 428/31938;

(Continued)

(56) References Cited

U.S. PATENT DOCUMENTS 4,134,957 A * 1/1979 Yoshimura .............. B29C 55/04
                                                      264/235.8
4,923,750 A    5/1990 Jones
4,968,463 A   11/1990 Levasseur
(Continued)

FOREIGN PATENT DOCUMENTS

DE    103 43 964 A1    4/2005
EP    1 288 257 A1    3/2003
(Continued)

*Primary Examiner* — James C Yager
(74) *Attorney, Agent, or Firm* — Kimberly-Clark Worldwide, Inc.

(57) ABSTRACT

A sustainable thermoplastic composition made by forming a mixture of virgin polypropylene and post-industrial-recycled material (PIR). The PIR may include a thermoplastic, elastomeric-polymer and a spunbond component. The mixture is melt-blended in an extruder. Extruded materials made from the mixture demonstrate little variance in the results of the IZOD Impact Test of materials containing 30 to 70 percent PIR, and a material containing 100 percent virgin polypropylene. In addition, the extruded materials containing 30 to 70 percent PIR demonstrate a substantially constant strain at yield, that strain at yield being substantially equal to that demonstrated by a material containing 100 percent virgin polypropylene.

17 Claims, 11 Drawing Sheets

(52) U.S. Cl.
CPC ............... *Y10T 428/31786* (2015.04); *Y10T 428/31931* (2015.04); *Y10T 428/31938* (2015.04)

(58) Field of Classification Search
CPC .... Y10T 428/31931; Y10T 428/31786; B29K 2105/26; B29B 11/10
See application file for complete search history.

(56) References Cited

U.S. PATENT DOCUMENTS

| | | | |
|---|---|---|---|
| 5,030,662 | A | 7/1991 | Banerjie |
| 5,128,212 | A * | 7/1992 | Kneale ............... B29B 17/0005 156/244.11 |
| 6,194,043 | B1 | 2/2001 | Fehn |
| 7,531,226 | B2 | 5/2009 | Lee et al. |
| 7,767,761 | B2 | 8/2010 | Costantini et al. |
| 8,083,064 | B2 | 12/2011 | Boswell et al. |
| 2003/0227108 | A1 | 12/2003 | Okerson |
| 2009/0118398 | A1 | 5/2009 | Nascimento et al. |
| 2009/0326082 | A1 | 12/2009 | Cernohous |
| 2010/0227963 | A1 | 9/2010 | Hironaka et al. |
| 2011/0109007 | A1 | 5/2011 | Ardrey |
| 2012/0059084 | A1 | 3/2012 | Brown et al. |

FOREIGN PATENT DOCUMENTS

| | | |
|---|---|---|
| JP | 2002/301456 A | 10/2002 |
| JP | 2002/309071 A | 10/2002 |
| KR | 10-2007-0012793 A | 1/2007 |
| WO | WO 2011/135228 A1 | 11/2011 |
| WO | WO 2011/085199 A2 | 1/2012 |

\* cited by examiner

SUSTAINABLE INJECTION MOLDED ARTICLES

CROSS REFERENCE TO RELATED APPLICATION

This application claims the benefit of U.S. Provisional Application No. 61/860,577, filed on Jul. 31, 2013. The entirety of Application No. 61/860,577 is incorporated herein by reference.

FIELD OF THE DISCLOSURE

The present disclosure relates to compositions for making injection molded articles, the compositions including virgin polymers and recycled material obtained from an industrial waste stream, and the methods of making sustainable injection molded articles.

BACKGROUND OF THE DISCLOSURE

The use of injection-molded plastic packaging has become a mainstay for packaging consumer products, especially those that have a higher moisture content, such as wet wipes. One advantage of such packaging is that it can designed to conveniently dispense product. However, such packaging can be expensive, adding to the cost of the overall product. In addition, such packaging is typically made from virgin petroleum-derived polymers formulated with materials that fluctuate greatly in price. Furthermore, injection molded articles made from virgin polymers have a high environmental foot print, otherwise referred to as a high "$eCO_2$". (The $eCO_2$ for a given material is determined by a material life cycle analysis wherein a method of measuring carbon equivalents is used to obtain the overall carbon footprint.) This is primarily due to the inherent high energy input used to produce the virgin polymers, and the resulting green-house gas emissions.

One solution to the high expense of injection molded packaging or other articles is to substitute a portion of the virgin polymers with recycled-content polymers. Such material may consist of post-consumer plastic waste. However, even though the addition of recycled content reduces cost, relying on post-consumer waste as a material supply is not necessarily advantageous because the physical properties of the resulting injection-molded articles (e.g. packaging) may vary and may not be adequate. With respect to plastic packaging, retailers and consumers may drop packages which may cause cracking and other damage to the package. Therefore, packaging material needs to be able to withstand a certain level of impact without cracking or otherwise failing.

A need exists for a composition that consistently exhibits physical properties within a desired range, such as impact strength and strain at failure. Further, there is a need for compositions that are sustainable in that they are made from waste or by-products, and not made solely from virgin materials. In addition, there is a need for a composition that produces injection-molded articles that are less costly than compositions of 100% virgin materials.

SUMMARY

The present disclosure in accordance with one aspect pertains to a method for forming a sustainable thermoplastic composition for injection molding. The method includes the step of forming a mixture by supplying a virgin polymer and a post-industrial-recycled material (PIR) to a feed section of an extruder, wherein the PIR comprises a thermoplastic, elastomeric-polymer and a spunbond component. The method further includes the step of melt processing the mixture within the extruder to form the thermoplastic composition.

Another aspect of the disclosure is directed to a thermoplastic material that is made with 30 to 70 parts by weight of 100% virgin polymer. The virgin polymer is selected from the the following: polypropylene, polyethylene, polystyrene, acrylonitrile-butadiene-styrene copolymers, polylactic acid, blends of polylactic acid and polyolefins and combinations thereof. The remainder of the thermoplastic material composition is post-industrial-recycled material (PIR).

Yet another aspect of the disclosure is a thermoplastic extruded article. The article includes a core layer of material having 30 to 70 parts by weight of 100% virgin polymer. The virgin polymer may be selected from the following: polypropylene, polyethylene, polystyrene, acrylonitrile-butadiene-styrene copolymers, polylactic acid, blends of polylactic acid and polyolefins and combinations thereof. The remainder of the article composition is post-industrial-recycled material (PIR).

Other features and aspects of the present disclosure are discussed in greater detail below.

BRIEF DESCRIPTION OF FIGURES

A full and enabling disclosure of the present invention, including the best mode thereof, directed to one of ordinary skill in the art, is set forth more particularly in the remainder of the specification, which makes reference to the appended figures in which.

Figure 1:
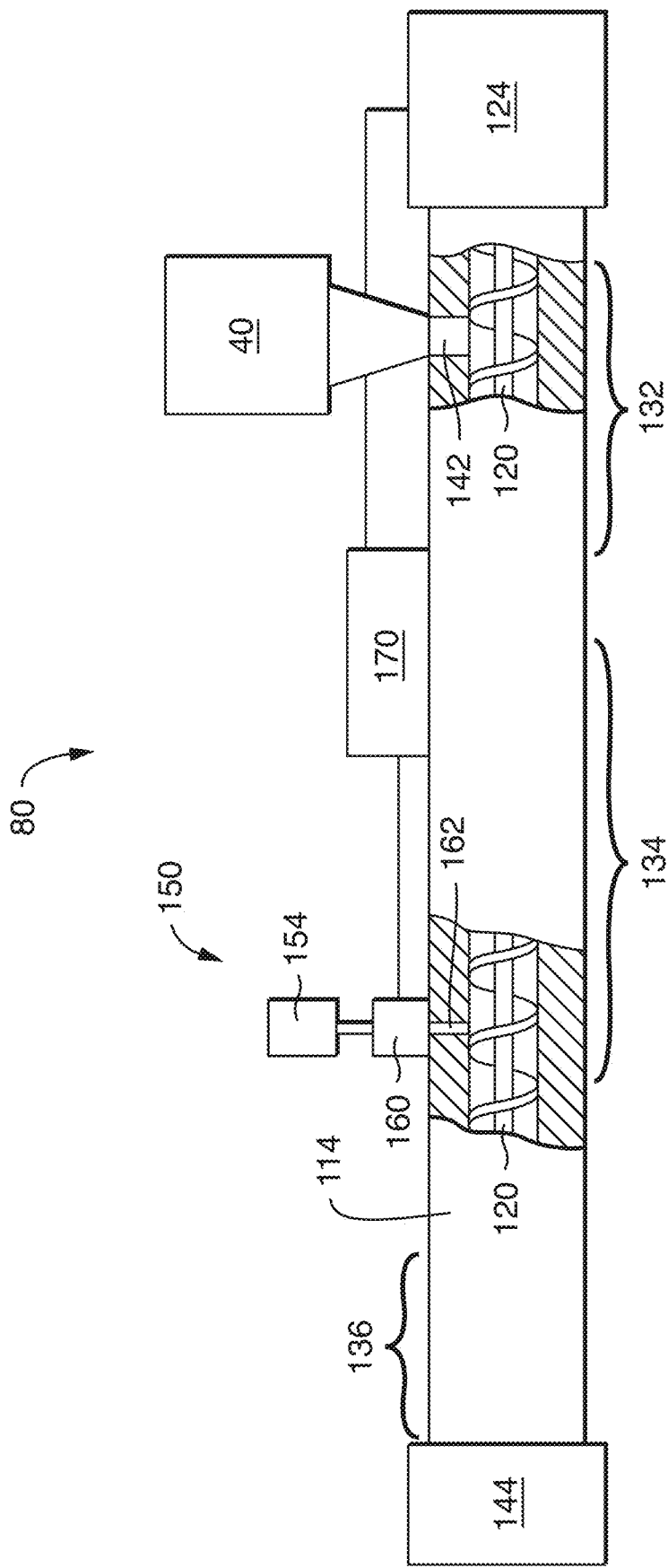
FIG. 1 is a partially broken away side view of an extruder that may be used in one embodiment of the present invention.

Repeat use of reference characters in the present specification and drawings is intended to represent same or analogous features or elements of the invention.

DETAILED DESCRIPTION

Section I.—Definitions

"Adhesive spun-bond film laminate" (otherwise referred to as "aSFL") as used herein is a laminate of a nonwoven facing and a breathable polyethylene film with an adhesive between the nonwoven facing and polyethylene films. One example of the nonwoven facing is a polypropylene spunbond. Another example is a polyethylene breathable film made from a calcium-carbonate-filled polyethylene stretched in the machine direction to create a microporous film that is breathable to allow moisture to pass through the film. One example of aSFL is disclosed in U.S. Pat. No. 7,812,214, incorporated herein by reference.

"Articles" as used herein refer to any injection-molded item, regardless of it's end use. Articles used in the field of packaging are referenced as only one example of items made from the composition of the present disclosure.

"Elastomer" as used herein refers to a thermoplastic elastomeric polymer. Such a polymer has a low Young's modulus, high recoverable deformation, and high yield strain as compared with other polymer materials.

"Post industrial recycle" (otherwise referred to as "PIR") as used herein is a material obtained from the manufacture of products containing stretch-bond laminate and/or adhesive spun-bond laminate as defined herein.

"Meltblown" refers to fibers formed by extruding a molten thermoplastic material through a plurality of fine, usually circular, die capillaries as molten threads or filaments into converging high velocity gas (e.g., air) streams, generally heated, which attenuate the filaments of molten thermoplastic material to reduce their diameters. Thereafter, the meltblown fibers are carried by the high velocity gas stream and are deposited on a collecting surface or support to form a web of randomly dispersed meltblown fibers. Such a process is disclosed, for example, in U.S. Pat. No. 3,849,241 to Butin et al. Meltblowing processes can be used to make fibers of various dimensions, including macrofibers (with average diameters from about 40 to about 100 microns), textile-type fibers (with average diameters between about 10 and 40 microns), and microfibers (with average diameters less than about 10 microns). Meltblowing processes are particularly suited to making microfibers, including ultra-fine microfibers (with an average diameter of about 3 microns or less). A description of an exemplary process of making ultra-fine microfibers may be found in, for example, U.S. Pat. No. 5,213,881 to Timmons et al. Meltblown fibers may be continuous or discontinuous and are generally self bonding when deposited onto a collecting surface.

"Nonwoven" and "nonwoven web" refer to materials and webs of material that are formed without the aid of a textile weaving or knitting process. For example, nonwoven materials, fabrics or webs have been formed from many processes such as, for example, meltblowing processes, spunbonding processes, air laying processes, coform processes, and bonded carded web processes.

"Spunbonded fibers" refers to small diameter fibers which are formed by extruding molten thermoplastic material as filaments from a plurality of fine, usually circular capillaries of a spinneret with the diameter of the extruded filaments then being rapidly reduced to fibers as by, for example, in U.S. Pat. No. 4,340,563 to Appel et al.; U.S. Pat. No. 3,692,618 to Dorschner et al.; U.S. Pat. No. 3,802,817 to Matsuki et al.; U.S. Pat. Nos. 3,338,992 and 3,341,394 to Kinney; U.S. Pat. No. 3,502,763 to Hartman; and U.S. Pat. No. 3,542,615 to Dobo et al., the contents of which are incorporated herein by reference in their entirety. Spunbond fibers are generally continuous and have diameters generally greater than about 7 microns, more particularly, between about 10 and about 20 microns.

"Spun-bonded laminate" ("SBL") refers to a composite material having at least two layers in which one layer is a gatherable layer and the other layer is an elastic layer. The layers are joined together when the elastic layer is extended from its original condition so that upon relaxing the layers, the gatherable layer is gathered. Such a multilayer composite elastic material may be stretched to the extent that the nonelastic material gathered between the bond locations allows the elastic material to elongate. One type of stretch bonded laminate is disclosed, for example, by U.S. Pat. No. 4,720,415 to Vander Wielen et al., the content of which is incorporated herein by reference in its entirety. Other composite elastic materials are disclosed in U.S. Pat. No. 4,789,699 to Kieffer et al.; U.S. Pat. No. 4,781,966 to Taylor; U.S. Pat. Nos. 4,657,802 and 4,652,487 to Morman; and U.S. Pat. No. 4,655,760 to Morman et al.; U.S. Pat. No. 5,366,793 to Fitts Jr. et al.; U.S. Pat. No. 5,385,775 to Wright; U.S. Pat. No. 5,514,470 to Haffner et al.; U.S. Pat. No. 6,902,796 to Morell et al.; U.S. Pat. No. 7,803,244 to Siqueira, et al.; the contents of which are incorporated herein by reference in their entirety.

"Virgin polymer" as used herein refers specifically to polypropelene (otherwise referred to as "PP"). Desirably, the polypropylene is 100 percent prime, containing no recycled content. However, it is anticipated that off-prime polypropylene may be used in the present disclosure.

Section II.—Description

The present disclosure addresses some of the problematic issues with current sustainable materials in that the articles of the present disclosure are made from recycled materials, PIR, that are more consistent with respect to content than post-consumer recycled materials or virgin materials. Such articles have more consistent and desirable physical properties, and are less costly than articles made from 100% prime polymer, which is a virgin polymer. The present disclosure discusses the method of making compositions containing PIR, the method of making articles from the compositions, and the physical properties of the articles.

A. Components a) Spun-Bonded Laminate ("SBL")

In general, the present disclosure pertains to thermoplastic polymer compositions containing virgin polymer and post industrial recycle ("PIR"). In a most desired aspect of the disclosure, the PIR is SBL.

As described supra, SBL is generally a composite material having at least on layer of elastomeric material sandwiched between non-elastic material. In one specific aspect of the disclosure, the SBL may have three layers. Generally, the outer layers may be composed of webs of nonelastic, nonwoven, polymer fibers. These fibers are desirably spunbond. The middle layer is made from amorphous polymer fibers. The fibers of the middle layer may be formed from, for example, elastomeric polystyrene/poly(ethylenebutylene)/polystyrene) block copolymers; linear tri-block copolymer based on styrene, ethylene/butylene and polystyrene; or styrene-butadiene-styrene block copolymer, thermoplastic polyurethane (described below in more detail), thermoplastic polyolefins (also described below in more detail), etc. Commercial examples of such a suitable copolymer includes KRATON, available from Kraton Polymers U.S. LLC, Houston, Tex. KRATON styrenic, thermoplastic, block-copolymers are available in several different formulations, a number of which are identified in U.S. Pat. Nos. 4,663,220 and 5,304,599, hereby incorporated by reference.

Thermoplastic Polyurethane

Thermoplastic polyurethanes are generally synthesized from a polyol, organic diisocyanate, and optionally a chain extender. The synthesis of such melt-processable polyurethane elastomers may proceed either stepwise (e.g., prepolymer dispensing process) or by simultaneous reaction of all components in a single stage (e.g., one-shot dispensing process) as is known in the art and described in more detail in U.S. Pat. No. 3,963,656 to Meisert, et al.; U.S. Pat. No. 5,605,961 to Lee, et al.; U.S. Pat. No. 6,008,276 to Kalbe, et al.; U.S. Pat. No. 6,417,313 to Kirchmeyer, et al.; and U.S. Pat. No. 7,045,650 to Lawrey, et al., as well as U.S. Patent Application Publication Nos. 2006/0135728 to Peerlings, et al. and 2007/0049719 to Brauer, et al., all of which are incorporated herein in their entirety by reference thereto for all purposes.

A polyol is generally any high molecular weight product having an active hydrogen component that may be reacted and includes materials having an average of about two or more hydroxyl groups per molecule. Long-chain polyols may be used that include higher polymeric polyols, such as polyester polyols and polyether polyols, as well as other acceptable "polyol" reactants, which have an active hydrogen component such as polyester polyols, polyhydroxy polyester amides, hydroxyl containing polycaprolactones, hydroxy-containing acrylic interpolymers, hydroxy-containing epoxies, and hydrophobic polyalkylene ether polyols. Typically, the polyol is substantially linear and has two to three, and more preferably two hydroxyl groups, and a number average molecular weight of from about 450 to about 10,000, in some embodiments from about 450 to about 6000, and in some embodiments from about 600 to about 4500. Suitable polyether dials may be produced by, for example, reacting one or more alkylene oxides having 2 to 4 carbon atoms in the alkylene residue with a starter molecule that contains two or more active hydrogen atoms in bound form. Exemplary alkylene oxides include ethylene oxide, 1,2-propylene oxide, epichlorohydrin and 1,2-butylene oxide and 2,3-butylene oxide. Exemplary starter molecules include water; aminoalcohols, such as N-alkyl-diethanolamines (e.g., N-methyl-diethanolamine); and diols, such as ethylene glycol, 1,3-propylene glycol, 1,4-butanediol and 1,6-hexanediol. Suitable polyester diols may be produced from dicarboxylic acids (or derivatives thereof) having 2 to 12 carbon atoms, preferably 4 to 6 carbon atoms, and polyhydric alcohols. Exemplary dicarboxylic acids include aliphatic dicarboxylic acids, such as succinic acid, glutaric acid, adipic acid, suberic acid, azelaic acid and sebacic acid; aromatic dicarboxylic acids, such as phthalic acid, isophthalic acid and terephthalic acid; as well as derivatives of such acids, such as carboxylic acid diesters having 1 to 4 carbon atoms in the alcohol residue, carboxylic anhydrides or carboxylic acid chlorides. Examples of suitable polyhydric alcohols include glycols with 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol, and dipropylene glycol. Esters of carbonic acid with the stated diols are also suitable, and particularly, those having 4 to 6 carbon atoms, such as 1,4-butanediol or 1,6-hexanediol; condensation products of co-hydroxycarboxylic acids, such as ?-hydroxycaproic acid or polymerisation products of lactones (e.g., optionally substituted ?-caprolactones). Preferred polyester diols include ethanediol polyadipates, 1,4-butanediol polyadipates, ethanediol/1,4-butanediol polyadipates, 1,6-hexanediol/neopentyl glycol polyadipates, 1,6-hexanediol/1,4-butanediol polyadipates and polycaproplactones.

The organic diisocyanates may include aliphatic diisocyanates, such as ethylene diisocyanate, 1,4-tetramethylene diisocyanate, 1,12-dodecane diisocyanate, 1,6-hexamethylene diisocyanate, mixtures thereof, etc.; cycloaliphatic diisocyanates, such as isophorone diisocyanate, 1,4-cyclohexane diisocyanate, 1-methyl-2,4-cyclohexane diisocyanate, 1-methyl-2,6-cyclohexane diisocyanate, 4,4'-, 2,4'- or 2,2'-dicyclohexylmethane diisocyanate, mixtures thereof, etc.; and/or aromatic diisocyanates, such as 2,4- or 2,6-toluene diisocyanate, 4,4'-diphenylmethane diisocyanate, 2,4'-diphenylmethane diisocyanate, 2,2'-diphenylmethane diisocyanate, naphthylene-1,5-diisocyanate, xylylene diisocyanate, methylene diphenyl isocyanate ("MDI"), hexamethylene diisocyanate ("HMDI"), mixtures thereof, etc.

The chain extenders typically have a number average molecular weight of from about 60 to about 400 and contains amino, thiol, carboxyl, and/or hydroxyl functional groups. The preferred chain extenders are those having two to three, and more preferably two, hydroxyl groups. As set forth above, one or more compounds selected from the aliphatic diols that contain from 2 to 14 carbon atoms may be used as the chain extender. Such compounds include, for example, ethanediol, 1,2-propanediol, 1,3-propanediol, 1,4-butanediol, 2,3-butanediol, 1,5-pentanediol, 1,6-hexanediol, diethylene glycol, dipropylene glycol, 1,4-cyclohexanediol, 1,4-dimethanolcyclohexane and neopentyl glycol, Diesters of terephthalic acid with glycols having 2 to 4 carbon atoms may also be employed. Some examples of such compounds include terephthalic acid bis-ethylene glycol and terephthalic acid bis-1,4-butanediol, hydroxyalkylene ethers of hydroquinone (e.g., 1-4-di(beta-hydroxyethyl)hydroquinone), ethoxylated bisphenols (e.g., 1,4-di(beta-hydroxyethyl)bisphenol A), (cyclo)aliphatic diamines (e.g., isophoronediamine, ethylendiamine, 1,2-propylenediamine, 1,3-propylenediannine, N-methyl-1,3-propylenediamine, and N,N'-dimethylethyiene-diamine), and aromatic diamines (e.g., 2,4-toluenediamine, 2,6-toluenediamine, 3,5-diethyl-2,4-toluenediamine and 3,5-diethyl-2,6-toluenediamine, and primary mono-, di-, tri- or tetraalkyl-substituted 4,4'-diaminodiphenylmethanes).

In addition to those noted above, other components may also be employed to form the thermoplastic polyurethane. Catalysts, for instance, may be employed to facilitate formation of the polyurethane. Suitable catalysts include, for instance, tertiary amines, such as triethylamine, dimethylcyclohexyl-amine, N-methylmorpholine, N,N'-dimethylpiperazine, 2-(dimethylaminoethoxy)-ethanol, diazabicyclo [2.2.2]octane, etc. as well as metal compounds, such as titanic acid esters, tin diacetate, tin dioctoate, tin dilaurate or the dialkyltin salts of aliphatic carboxylic acids such as dibutyltin diacetate or dibutyltin dilaurate or other similar compounds. Still other suitable additives that may be employed include light stabilizers (e.g., hindered amines), chain terminators, slip agents and mold release agents (e.g., fatty acid esters, the metal soaps thereof, fatty acid amides, fatty acid ester amides and silicone compounds), plasticizers, antiblocking agents, inhibitors, stabilizers against hydrolysis, heat and discoloration, dyes, pigments, inorganic and/or organic fillers, fungistatically and bacteriostatically active substances, fillers, etc.

The thermoplastic polyurethane typically has a melting point of from about 75 degrees centigrade to about 250 degrees centigrade, in some embodiments from about 100 degrees centigrade to about 240 degrees centigrade, and in some embodiments, from about 120 degrees centigrade to about 220 degrees centigrade The glass transition temperature ("Tg") of the thermoplastic polyurethane may be relatively low, such as from about −150 degrees centigrade to about 0 degrees centigrade, in some embodiments from about −100 degrees centigrade to about −10 degrees centigrade, and in some embodiments, from about −85 degrees centigrade to about −20 degrees centigrade The melting temperature and glass transition temperature may be determined using differential scanning calorimetry ("DSC") in accordance with ASTM D-3417. Examples of such thermoplastic polyurethanes are available under the designation DESMOPAN™ from Bayer MaterialScience and under the designation ESTANE™ from Lubrizol. DESMOPAN™ DP 9370A, for instance, is an aromatic polyether-based polyurethane formed from poly(tetramethylene ether glycol) and 4,4-methylenebis(phenylisocyanate) ("MDI") and has a glass transition temperature of about −70 degrees centigrade and a melting temperature of from about 188 degrees centigrade to about 199 degrees centigrade ESTANE™ 58245 is likewise an aromatic polyether-based polyurethane having a glass transition temperature of about −37 degrees centigrade and a melting temperature of from about 135 degrees centigrade to about 159 degrees centigrade.

Olefinic Elastomer

Various olefinic elastomers may be employed in the film as is known in the art. In one embodiment, for example, the olefinic elastomer is a polyolefin that has or is capable of exhibiting a substantially regular structure ("semi-crystalline"). Such olefinic elastomers may be substantially amorphous in their undeformed state, but form crystalline domains upon stretching. The degree of crystallinity of the olefin polymer may be from about 3 percent to about 30 percent, in some embodiments from about 5 percent to about 25 percent, and in some embodiments, from about 5 percent and about 15 percent. Likewise, the olefinic elastomer may have a latent heat of fusion (ΔHf), which is another indicator of the degree of crystallinity, of from about 15 to about 75 Joules per gram ("J/g"), in some embodiments from about 20 to about 65 J/g, and in some embodiments, from 25 to about 50 J/g. The olefinic elastomer may also have a Vicat softening temperature of from about 10 degrees centigrade to about 100 degrees centigrade, in some embodiments from about 20 degrees centigrade to about 80 degrees centigrade, and in some embodiments, from about 30 degrees centigrade to about 60 degrees centigrade The olefinic elastomer may have a melting temperature of from about 20 degrees centigrade to about 120 degrees centigrade, in some embodiments from about 35 degrees centigrade to about 90 degrees centigrade, and in some embodiments, from about 40 degrees centigrade to about 80 degrees centigrade The latent heat of fusion (DELTAHf) and melting temperature may be determined using differential scanning calorimetry ("DSC") in accordance with ASTM D-3417 as is well known to those skilled in the art. The Vicat softening temperature may be determined in accordance with ASTM D-1525.

Exemplary semi-crystalline olefinic elastomers include polyethylene, polypropylene, blends and copolymers thereof. In one particular embodiment, a polyethylene is employed that is a copolymer of ethylene and an α-olefin, such as a C3-C20 α-olefin or C3-C12 α-olefin. Suitable α-olefins may be linear or branched (e.g., one or more C1-C3 alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene content of such copolymers may be from about 60 mole percent to about 99 mole percent, in some embodiments from about 80 mole percent to about 98.5 mole percent, and in some embodiments, from about 87 mole percent to about 97.5 mole percent. The α-olefin content may likewise range from about 1 mole percent to about 40 mole percent, in some embodiments from about 1.5 mole percent to about 15 mole percent, and in some embodiments, from about 2.5 mole percent to about 13 mole percent. Propylene polymers may also be suitable for use as an olefinic elastomer. In one particular embodiment, the semi-crystalline propylene-based polymer includes a copolymer of propylene and an α-olefin, such as a C2-C20 α-olefin or C2-C12 α-olefin. Particularly desired α-olefin comonomers are ethylene, 1-butene, 1-hexene and 1-octene. The propylene content of such copolymers may be from about 60 mole percent to about 99.5 weight percent, in some embodiments from about 80 mole percent to about 99 mole percent, and in some embodiments, from about 85 mole percent to about 98 mole percent. The α-olefin content may likewise range from about 0.5 mole percent to about 40 mole percent, in some embodiments from about 1 mole percent to about 20 mole percent, and in some embodiments, from about 2 mole percent to about 15 mole percent.

Any of a variety of known techniques may generally be employed to form the olefinic elastomers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obioeski et al.; U.S. Pat. No. 5,272,236 to Lai et al.; and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers (Mw/Mn) of below 4, controlled short chain branching distribution, and controlled isotacticity.

The density of such α-olefin copolymers is a function of both the length and amount of the α-olefin. That is, the greater the length of the α-olefin and the greater the amount of α-olefin present, the lower the density of the copolymer. Although not necessarily required, substantially linear elastomers are particularly desirable in that the content of α-olefin short chain branching content is such that the copolymer exhibits both plastic and elastomeric characteristics. Because polymerization with α-olefin comonomers decreases crystallinity and density, the resulting elastomer normally has a density lower than that of polyethylene thermoplastic polymers (e.g., LLDPE), but approaching and/or overlapping that of other elastomers. For example, the density of the olefinic elastomer may be about 0.91 grams per cubic centimeter (g/cm3) or less, in some embodiments from about 0.85 to about 0.89 g/cm3, and in some embodiments, from about 0.85 g/cm3 to about 0.88 g/cm3.

Preferred ethylene elastomers for use in the present invention are ethylene-based copolymer plastomers available under the EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Such ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes. Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

The melt flow index (MI) of the olefinic elastomers may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190 degrees centigrade The melt flow index is the weight of the polymer (in grams) that may be forced through an extrusion rheometer orifice (0.0825-inch diameter) when subjected to a force of 2.16 kilograms in 10 minutes at 190 degrees centigrade, and may be determined in accordance with ASTM Test Method D1238-E.

Of course, other olefinic elastomers may also be employed in the present invention. In one embodiment, for example, the thermoplastic elastomer may be a styrene-olefin block copolymer, such as styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. Such polymers may be formed by selective hydrogenation of styrene-diene block copolymers, such as described in U.S. Pat. Nos. 4,663,220, 4,323,534, 4,834,738, 5,093,422 and 5,304,599, which are hereby incorporated in their entirety by reference thereto for all purposes. Particularly suitable thermoplastic elastomers are available from Kraton Polymers LLC of Houston, Tex. under the trade name KRATON®. Other commercially available block copolymers include the S-EP-S elastomeric copolymers available from Kuraray Company, Ltd. of Okayama, Japan, under the trade designation SEPTON®. Also suitable are polymers composed of an A-B-A-B tetra-block copolymer, such as discussed in U.S. Pat. No. 5,332,613 to Taylor, et al., which is incorporated herein in its entirety by reference thereto for all purposes. An example of such a tetrablock copolymer is a styrene-poly(ethylene-propylene)-styrene-poly(ethylene-propylene) ("S-EP-S-EP") block copolymer.

In another aspect of the disclosure, the SBL has four layers made from the following: i) a first layer of substantially parallel filaments formed of an elastomeric polymer, the elastomeric polymer having an average molecular weight of from about 65,000 g/mol to about 100,000 g/mol; ii) a second layer of elastomeric meltblown fibers, the meltblown fibers bonded to at least a portion of the first layer filaments; iii) a third layer of spunbond fibers; and iv) a fourth layer of spunbond fibers. The first and second layers are disposed between the third and fourth layers.

There are many other types of SBL that may be used in the present disclosure, and the two examples are not meant to be limiting.

b) Polymer

The article of the present disclosure also includes a polymer such as polypropylene, polyethylenes including high density polyethylene, linear low density polyethylene, ethylene copolymers such as poly(ethylene-co-propylene), poly(ethylene-co-vinyl acetate (EVA), etc. polystyrene, polyethylene terephthalate (PET), polylactic acid (PLA), blends of PLA with polyolefins such as polypropylene or high density polyethylene, acrylonitrile-butadiene-styrene copolymers (ABS), polystyrene, etc. Desirably, the polypropylene is 100% virgin grade. However, it is contemplated that recycled polypropylene may be used.

c) Other Components

Besides the components noted above, still other additives may also be incorporated into the composition, such as plasticizers, fragrances, melt stabilizers, dispersion aids (e.g., surfactants), processing stabilizers, heat stabilizers, light stabilizers, UV stabilizers, antioxidants, heat aging stabilizers, whitening agents, antiblocking agents, antistatic agents, bonding agents, lubricants, fillers, etc.

B. Article Construction

The thermoplastic composition of the present invention is formed by melt-blending together PIR and a virgin polymer. The melt blending can be performed in a single screw extruder, a twin screw extruder, or a continuous melt mixer.

In one aspect of the disclosure, the thermoplastic composition is produced from a mixture of virgin polymer (e.g. 100% virgin PP) and PIR polymers. The mixture may include from about 5% by weight PIR to about 90% by weight PIR, or about 10% by weight PIR to about 80% by weight PIR. Preferably, the mixture comprises from about 20% of PIR to about 80% PIR. In another aspect of the disclosure, the material is made from about 30 parts by weight of virgin polymer (e.g. 100% virgin PP) and 70 parts by weight of the PIR (30:70), or in the alternative, the ratio may be about 40:60, or about 50:50, or about 60:40 or about 70:30.

The melt extrusion temperature can range from the highest melting point of the components to the lowest decomposition temperature of the components. An example of the temperatures range is from about 160° C. to about 240° C.

Referring to FIG. 1, for example, one embodiment of an extruder 80 that may be employed for this purpose is illustrated. As shown, the extruder 80 contains a housing or barrel 114 and a screw 120 (e.g., barrier screw) rotatably driven on one end by a suitable drive 124 (typically including a motor and gearbox). One exemplary single-screw extruder 80 is a BOY 22D Injection Molding Machine which may be obtained from BOY Machines, Inc., Exton, Pa. In the alternative, a twin-screw extruder may be employed that contains two separate screws. One example of twin screw extruder is a co-rotating twin screw extruder (Werner and Pfleiderer Corporation, Ramsey, N.J.).

The extruder 80 generally contains three sections: the feed section 132, the melt section 134, and the mixing section 136. The feed section 132 is the input portion of the barrel 114 where the polymeric material is added. The melt section 134 is the phase change section in which the plastic material is changed from a solid to a liquid. The mixing section 136 is adjacent the output end of the barrel 114 and is the portion in which the liquid plastic material is completely mixed. While there is no precisely defined delineation of these sections when the extruder is manufactured, it is well within the ordinary skill of those in this art to reliably identify the melt section 134 of the extruder barrel 114 in which phase change from solid to liquid is occurring.

A hopper 40 is also located adjacent to the drive 124 for supplying the virgin polymer, SBL and other optional materials through an opening 142 in the barrel 114 to the feed section 132. Opposite the drive 124 is the output end 144 of the extruder 80, where extruded plastic is output for further processing to form an article, which will be described in more detail below.

In some aspects, a liquid component may be added to the thermoplastic composition, e.g. fragrances, plastizers, etc. Thus, a liquid-component supply station 150 may be provided on the extruder barrel 114 that includes at least one hopper 154, which is attached to a pump 160 to selectively provide the liquid through an opening 162 to the melt section 134. In this manner, the liquid may be mixed with the polymers in a consistent and uniform manner. Of course, in addition to or in lieu of supplying the liquid to the melt section 134, it should also be understood that it may be supplied to other sections of the extruder, such as the feed section 132 and/or the mixing section 136. For example, in certain embodiments, the liquid may be directly injected into the hopper 40 along with other polymeric materials.

The pump 160 may be a high pressure pump (e.g., positive displacement pump) with an injection valve so as to provide a steady selected amount of liquid to the barrel 114. If desired, a programmable logic controller 170 may also be employed to connect the drive 124 to the pump 160 so that it provides a selected volume of liquid based on the drive rate of the screw 120. That is, the controller 170 may control the rate of rotation of the drive screw 120 and the pump 160 to inject the liquid at a rate based on the screw rotation rate. Accordingly, if the rotation rate of the screw 120 is increased to drive greater amounts of plastic through the barrel 114 in a given unit of time, the pumping rate of the pump 160 may be similarly increased to pump proportionately greater amounts of liquid into the barrel 114.

The PIR and polymeric components may be processed within the extruder 80 under shear, pressure and heat to ensure sufficient mixing. For example, melt processing may occur at a temperature of from about 75° C. to about 280° C., in some embodiments, from about 100° C. to about 250° C., and in some embodiments, from about 150° C. to about 200° C. Likewise, the apparent shear rate during melt processing may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4 Q/\pi R^3$, where Q is the volumetric flow rate ("m$^3$/s") of the polymer melt and R is the radius ("m") of the capillary (e.g., extruder die) through which the melted polymer flows. In one aspect, the desired temperature of the extruder-zones may be as follows: the feed zone is about 190° C.; the compression zone is about 193° C.; the metering zone is about 195° C.; and the final zone about 200° C.

It may be most efficient to injection-mold the melt-blend directly after processing. However, it is contemplated that the melt-blended composition may flow through a die to form an extrudate in the form of a strand, and be cut into pellets for later use.

Section III.—Experiments

Figure 2:
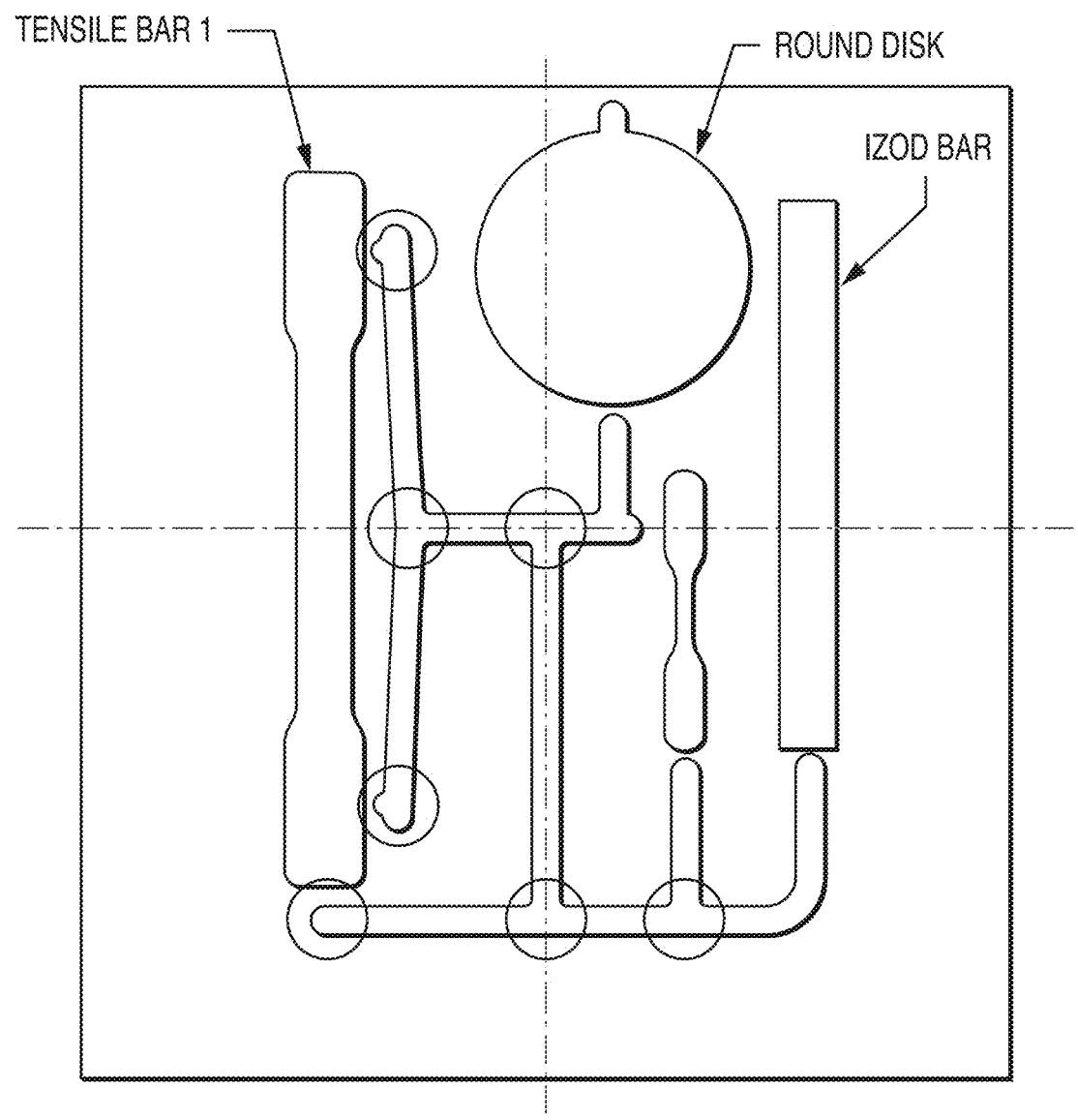
FIG. 2 is a plan view of an ASTM specimen mold from which Izod test and tensile test samples were generated.

The following three materials were used to make the samples below:
1. PP: PRO-FAX SG722 Polypropylene (LyondellBasell Polymers, Houston, Tex.) having a melt flow of 25 g/10 minutes at 230° C.
2. aSFL: adhesive spun-bond film laminate with a melt flow of 12 g/10 minutes at 190° C.
3. SBL: spun-bonded laminate with a melt flow of 10 g/10 minutes at 190° C.
Injection Molding Machine:
BOY 22D Injection Molding Machine (BOY Machines, Inc., Exton, Pa.). This machine has a 24.2 ton clamping force unit and a shot size of 1.2 oz.
Specimen Mold:
An ASTM D638 standard test specimen mold was used to create all test specimens shown in FIG. 2. The specimen mold may be obtained form Master Precision Products, Inc., Greenville, Mich.
Samples:
The following practical examples of materials made from the PP and PIR are described to better illustrate the disclosure, without imposing any limiting character besides those contained in the attached claims.

Comparative Example 1

The 100% virgin PP was processed using a BOY 22D Injection Molding Machine. The temperature profile was 190° C., 193° C., 195° C. and 200° C. for extruder zones 1 through 4. The mold was set at 12.8° C. The resulting specimens had a dull, off-white appearance with a smooth surface. The cycle time was about 30 seconds. No processing issues were observed. Mold shrinkage results within 48 hours were 1.8% in the width and 1.3% in the length.

Comparative Example 2 aSFL was processed using a BOY 22D Injection Molding Machine. The temperature profile was 190° C., 193° C., 195° C. and 200° C. for zones 1 through 4. The mold was set at 12.8° C. The resulting specimens had a dull, off-white appearance with a smooth surface. The cycle time was about 30 seconds. No processing issues were observed. Mold shrinkage results within 48 hours were 0.9% in the width and 1.3% in the length.

Comparative Example 3

SBL was processed using a BOY 22D Injection Molding Machine. The temperature profile was 190° C., 193° C., 195° C. and 200° C. for zones 1 through 4. The mold was set at 12.8° C. The resulting specimens had a dull, off-white appearance with a smooth surface. The cycle time was about 30 seconds. No processing issues were observed. Mold shrinkage results within 48 hours were 0% in the width and 1.2% in the length.

Example 1

The PP and aSFL materials were dry blended at 70:30 (weight ratios). The polymer blend was processed using a BOY 22D Injection Molding Machine. The temperature profile was 190° C., 193° C., 195° C. and 200° C. for zones 1 through 4. The mold was set at 12.8° C. The resulting specimens had a dull, off-white appearance with a smooth surface. The cycle time was about 30 seconds. No processing issues were observed. Mold shrinkage results within 48 hours were 1.3% in the width and 1.7% in the length.

Example 2

The PP and aSFL materials were dry blended at 50:50 (weight ratios). The polymer blend was processed using a BOY 22D Injection Molding Machine. The temperature profile was 190° C., 193° C., 195° C. and 200° C. for zones 1 through 4. The mold was set at 12.8° C. The resulting specimens had a dull, off-white appearance with a smooth surface. The cycle time was about 30 seconds. No processing issues were observed. Mold shrinkage results within 48 hours were 1.3% in the width and 1.8% in the length.

Example 3

The PP and aSFL materials were dry blended at 30:70 (weight ratios). The resulting polymer blend was processed using a BOY 22D Injection Molding Machine. The temperature profile was 190° C., 193° C., 195° C. and 200° C. for zones 1 through 4. The mold was set at 12.8° C. The resulting specimens had a dull, off-white appearance with a smooth surface. The cycle time was about 30 seconds. No processing issues were observed. Mold shrinkage results within 48 hours were 1.0% in the width and 1.5% in the length.

Example 4

The PP and SBL materials were dry blended at 70:30 (weight ratios)w/w. The resulting polymer blend was processed using a BOY 22D Injection Molding Machine. The temperature profile was 190° C., 193° C., 195° C. and 200° C. for zones 1 through 4. The mold was set at 12.8° C. The resulting specimens had a dull, off-white appearance with a smooth surface. The cycle time was about 30 seconds. No processing issues were observed. Mold shrinkage results within 48 hours were 1.0% in the width and 1.4% in the length.

Example 5

The PP and SBL materials were dry blended at 50:50 w/w. The resulting polymer blend was processed using a BOY 22D Injection Molding Machine. The temperature profile was 190° C., 193° C., 195° C. and 200° C. for zones 1 through 4. The mold was set at 12.8° C. The resulting specimens had a dull, off-white appearance with a smooth surface. The cycle time was about 30 seconds. No processing issues were observed. Mold shrinkage results within 48 hours were 1.0% in the width and 1.4% in the length.

Example 6

The PP and SBL materials were dry blended at 30:70 (weight ratios). The resulting polymer blend was processed using a BOY 22D Injection Molding Machine. The temperature profile was 190° C., 193° C., 195° C. and 200° C. for zones 1 through 4. The mold was set at 12.8° C. The resulting specimens had a dull, off-white appearance with a smooth surface. The cycle time was about 30 seconds. No processing issues were observed. Mold shrinkage results within 48 hours were 1.2% in the width and 1.4% in the length.

IZOD Test

Test Method: ASTM D 256-10, "Standard Test Method for Determining the Izod Pendulum Impact Resistance of Plastics", Test Method A Test Conditions: 23±2° C., 50±10% Relative humidity Conditioning: 40+ hours, 23±2° C., 50±10% Relative humidity Preparation: Machined from injection molded sample shown in FIG. 2 (IZOD bar)

Notch: 45° angle with an end radius of 0.010 inches

Figure 3:
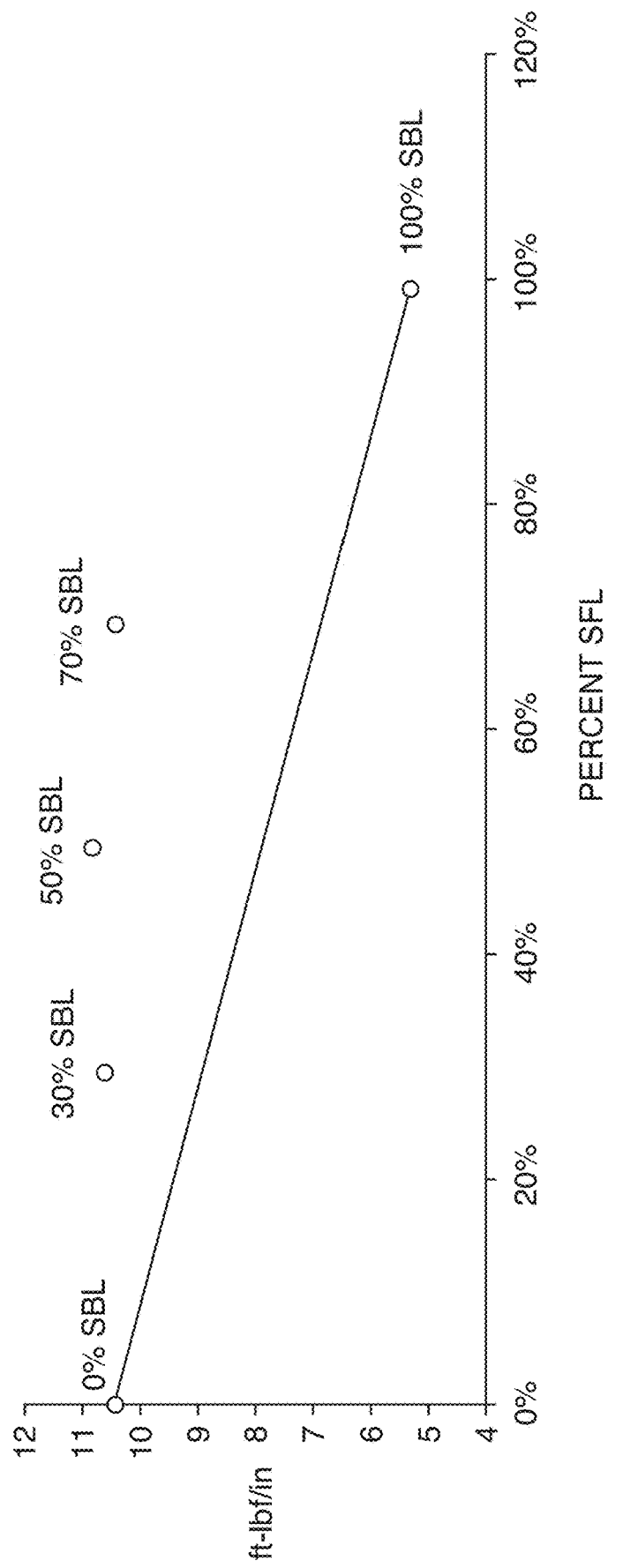
FIG. 3 is a graph that shows the impact strength of Izod specimens prepared according to FIG. 2, as a function of composition.

Results: As can be seen in Table 1, specimens exhibiting the most desirable impact strength were those made according to Comparative Example 1 and Examples 6-8. It is shown that a 30:70 ratio of PP/SBL exhibits as much Izod Impact Strength as 100% PP, a virgin PP material, while the Izod impact strength of 100% SBL is low by comparison. This synergistic effect is a surprising and unexpected result. The synergistic effect can be more easily observed from FIG. 3. FIG. 3 is a plot of the impact strength as a function of virgin PP/SBL compositions. It shows that the binary blends of PP and SBL have three distinct compositions (respectively at 30%, 50%, and 70% of SBL) which had Izod impact strength higher than those expected from mixture rule (the straight line in FIG. 3).

SBL is a desirable PIR because when combined with the virgin polymer PP, synergistic results occur that are quite surprising and unexpected. For instance, articles made from the blended PP/SBL material have physical properties that are the same as or improved over articles made from 100% virgin polymer or 100% SBL. Indeed, Izod impact tests show that an article made from as little as 30% wt. PP and 70% wt. SBL performs superiorly over an article made from 100% PP or 100% SBL. In addition, the failure strain of the SBL/PP material remains relatively constant whether the material includes 100% SBL or as little as 30% SBL, e.g. 30:70 SBL/PP material.

Without being bound by theory, the synergy of combining polypropylene ("PP") and SBL may be due to dispersed domains of thermoplastic elastomer throughout a continuous phase PP matrix. The material, made by combining the thermoplastic elastomer with a PP matrix, possesses the unique capability to absorb the impact energy imparted during an impact test, such as an IZOD test described herein. Because of the incompatibility between polypropylene (which does not contain aromatic structural units) and the thermoplastic elastomer (which has polystyrene hard-segments with aromatic structural units), it is unexpected that the combination of these materials would result in a fine dispersion of thermoplastic elastomer within the PP matrix.

FIG. 3 shows the relationship between the impact strength as a function of PP/SBL composition. It shows that all the mixtures impact strength is above the straight line, as expected. This is an unexpected and synergistic effect. Commonly, recycled polymers serve to weaken polymeric articles made from a blend of virgin and recycled polymers. Such weakening is demonstrated by the combination of PP and aSFL.

Figure 4:
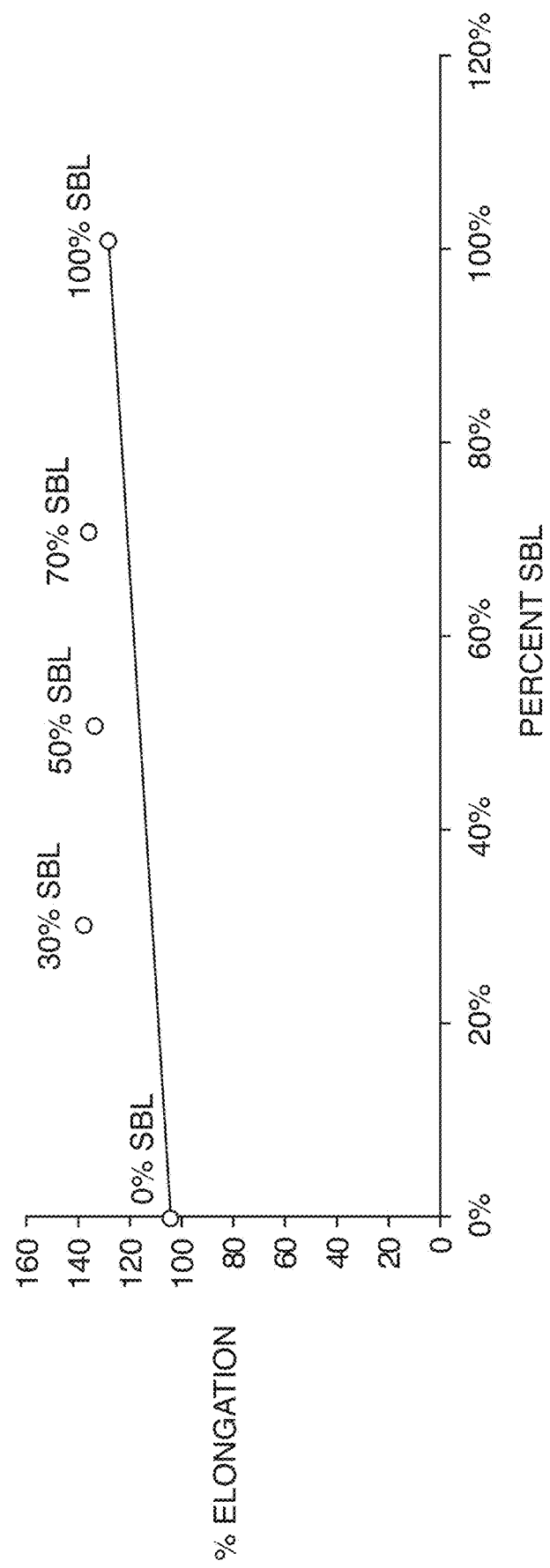
FIG. 4 is a graph that shows the strain at failure of tensile bars prepared according to FIG. 2, as a function of composition.

The plot of strain at break as a function of composition is shown in FIG. 4. Once again, the middle three compositions showed synergistic effect.

TABLE 1

| Samples | Hammer Capacity (ft · lb) | Izod Impact Strength (ft · lb/in) |
|---|---|---|
| Comparative Example 1 - 100% PP | 2.0 | 10.4 |
| Example 1 - PP/aSFL 70:30 | 2.0 | 6.1 |
| Example 2 - PP/aSFL 50:50 | 2.0 | 2.0 |
| Example 3 - PP/aSFL 30:70 | 2.0 | 1.6 |
| Comparative Example 2 - 100% aSFL | 2.0 | 0.6 |
| Example 4 - PP/SBL 70:30 | 2.0 | 10.6 |
| Example 5 - PP/SBL 50:50 | 2.0 | 10.8 |
| Example 6 - PP/SBL 30:70 | 2.0 | 10.4 |
| Comparative Example 3 - 100% SBL | 2.0 | 5.3 |

Tensile Test
Test method: ASTM D638 entitled "Standard Test Method For The Tensile Properties Of Plastics".
Test Conditions: 23±2° C., 50±10% Relative humidity
Conditioning: 40+ hours, 23±2° C., 50±10% Relative humidity
Test Results: Table 2 shows the tensile properties of the injection molded samples. The strain at break of 100% PP and 100% SBL had a strain-at-failure of 10% and 127% respectively. It was surprising that the blends of PP and SBL (Examples 4 to 6) had strain-at-failure values ranging from 132% to 136%. This is unexpected synergistic effect.

Figure 5:
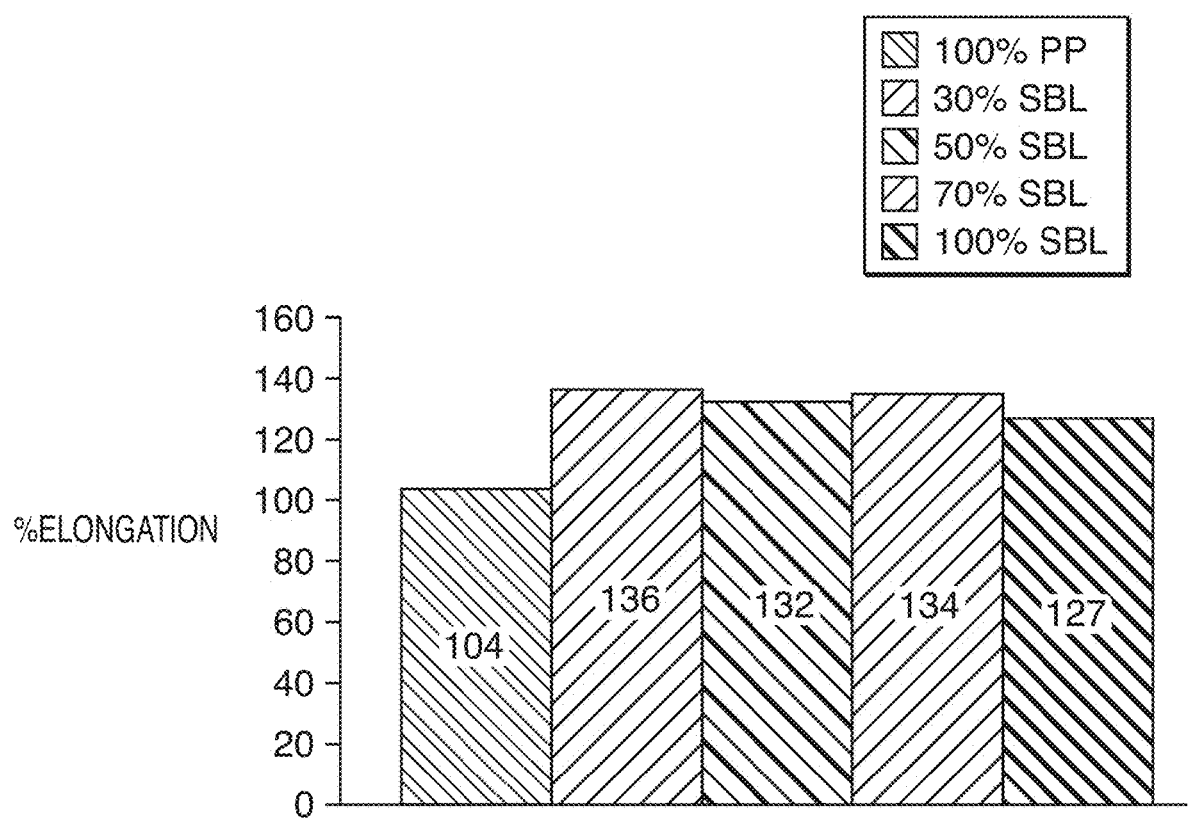
FIG. 5 is a graph showing the strain at failure of tensile bars prepared according to FIG. 2, as a function of composition.
Figure 6:
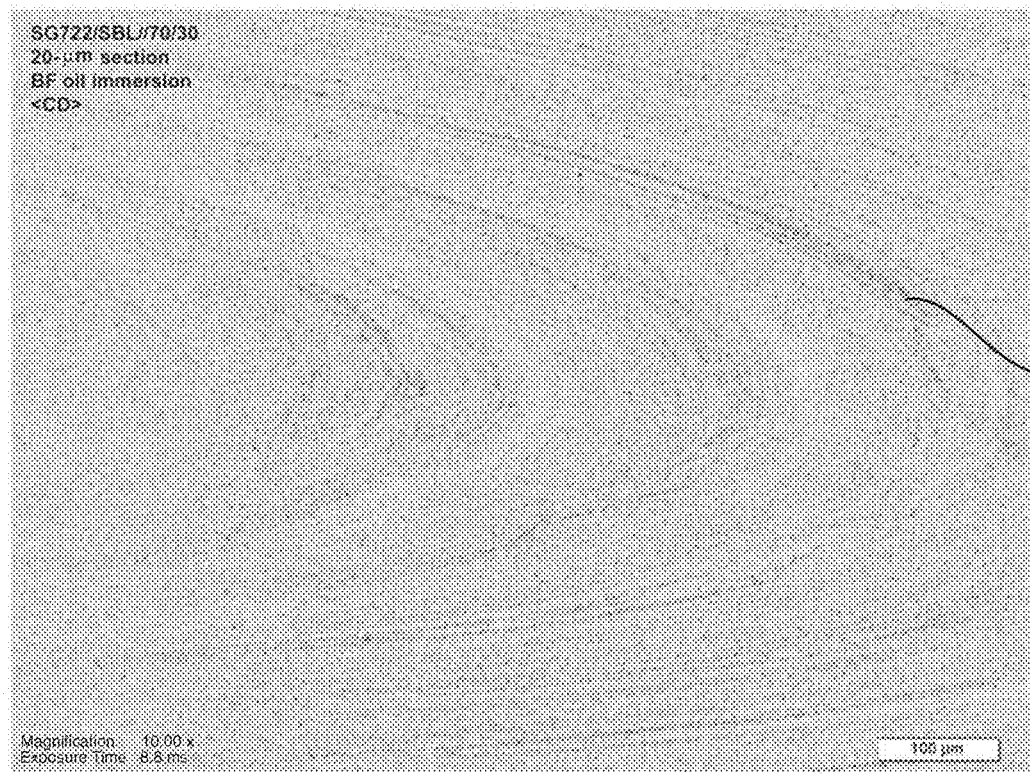
FIG. 6 is a micrograph of a cross-section of a tensile bar according to FIG. 2, injection molded from a 30/70 blend of virgin polymer/reclaimed SBL.
Figure 7:
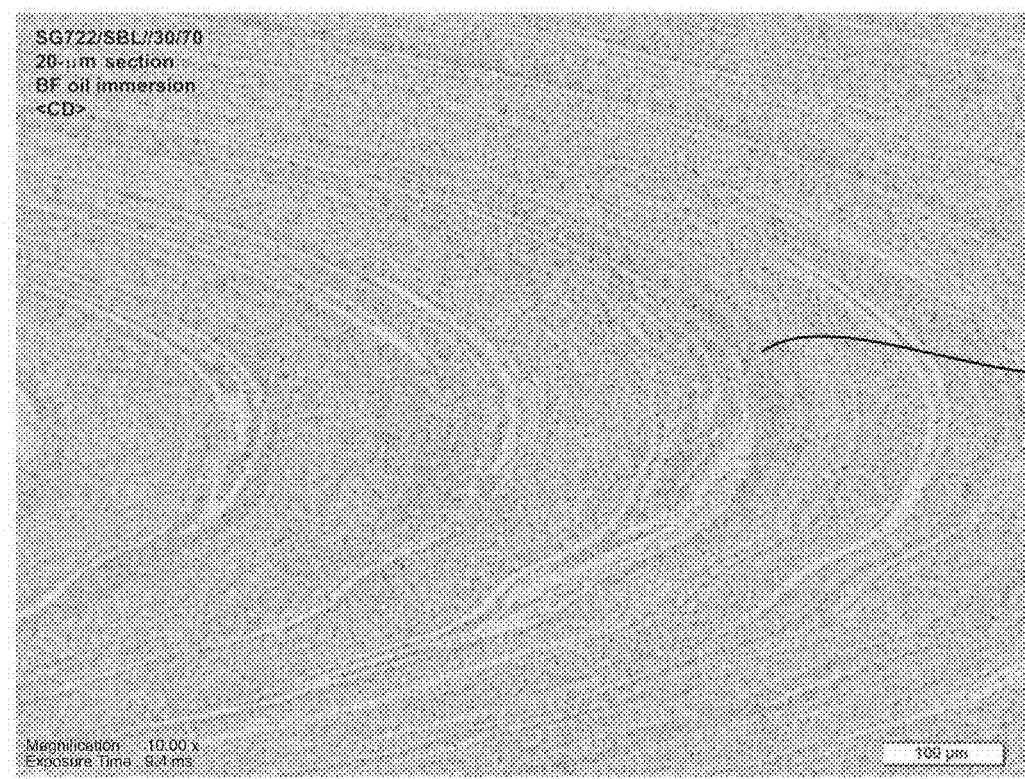
FIG. 7 is a micrograph of a cross-section of a tensile bar according to FIG. 2, injection molded from a 70/30 blend of virgin polymer/reclaimed SBL.
Figure 8:
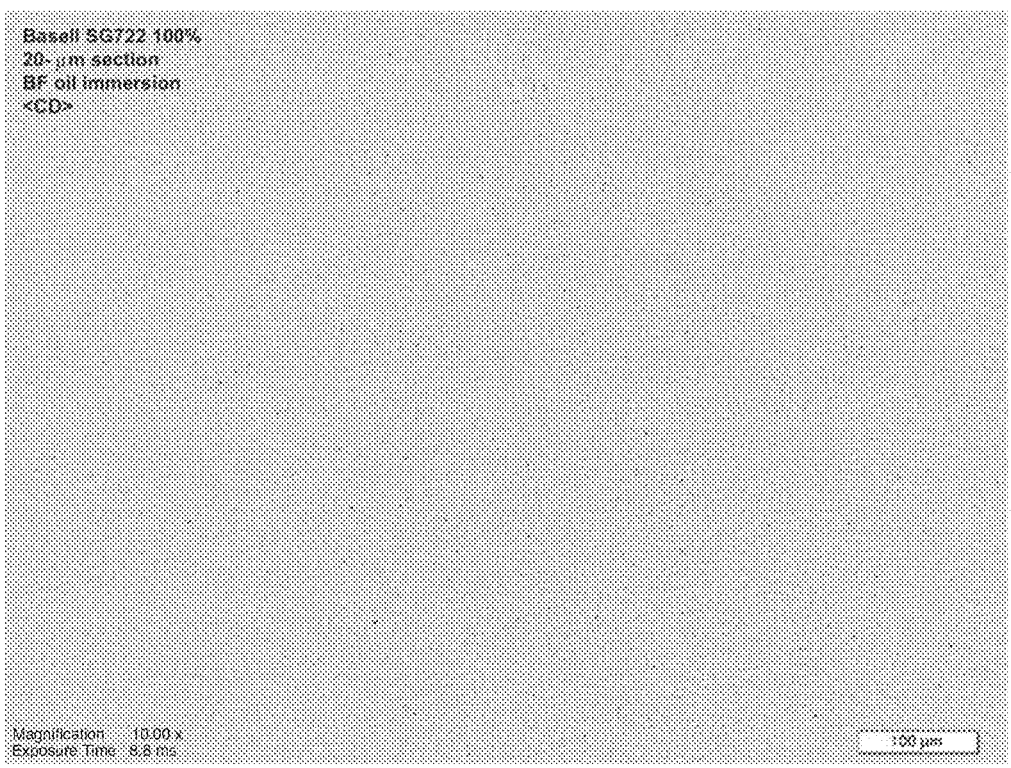
FIG. 8 is a micrograph of a cross-section of a tensile bar according to FIG. 2, injection molded from virgin polymer.
Figure 9:
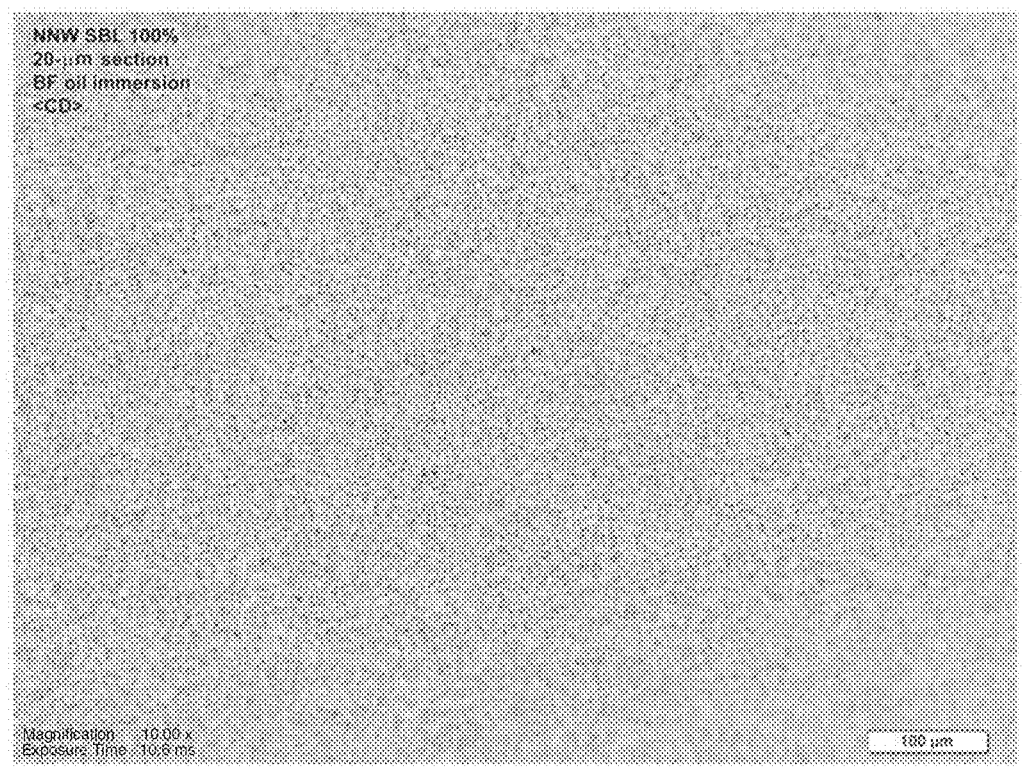
FIG. 9 is a micrograph of a cross-section of a tensile bar according to FIG. 2, injection molded from SBL.
Figure 10:
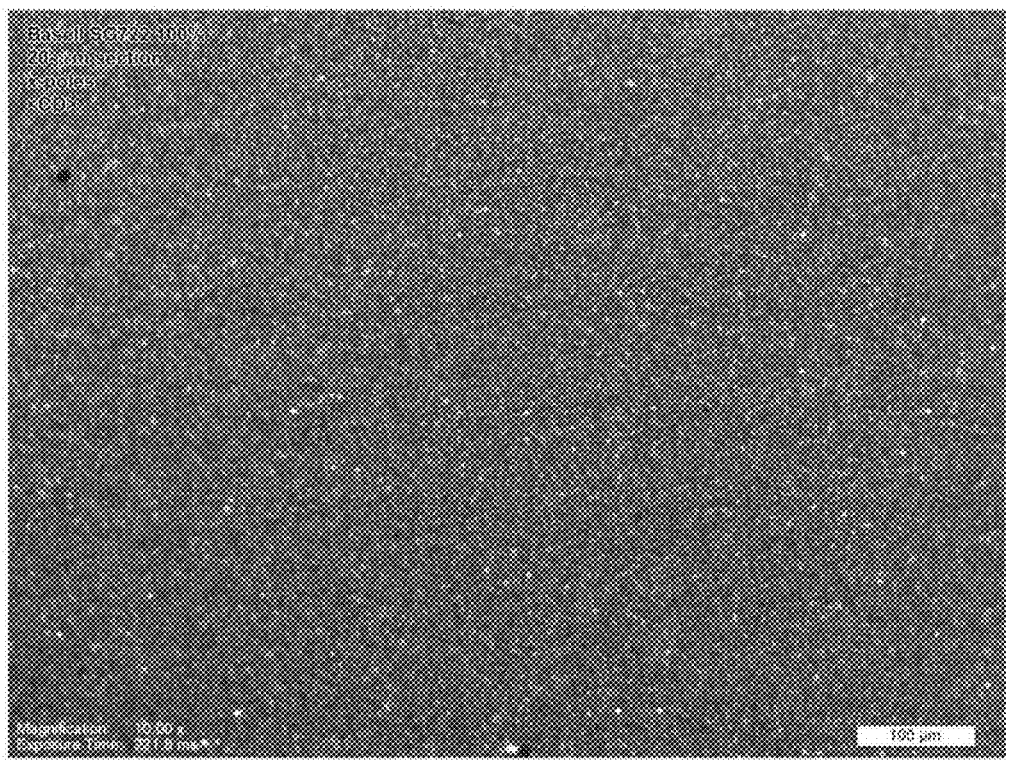
FIG. 10 is a micrograph showing the distribution of crystalline material across the tensile bar according to FIG. 2, for virgin polymer.
Figure 11:
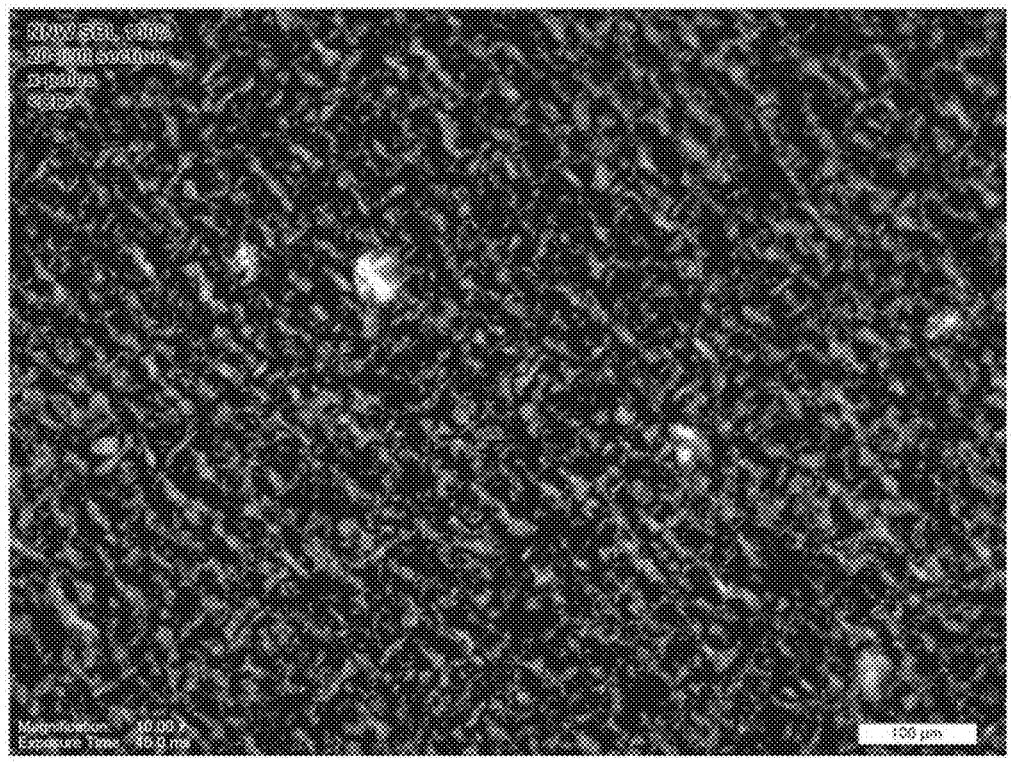
FIG. 11 is a micrograph showing the distribution of crystalline material across the tensile bar according to FIG. 2, for SBL.
Figure 12:
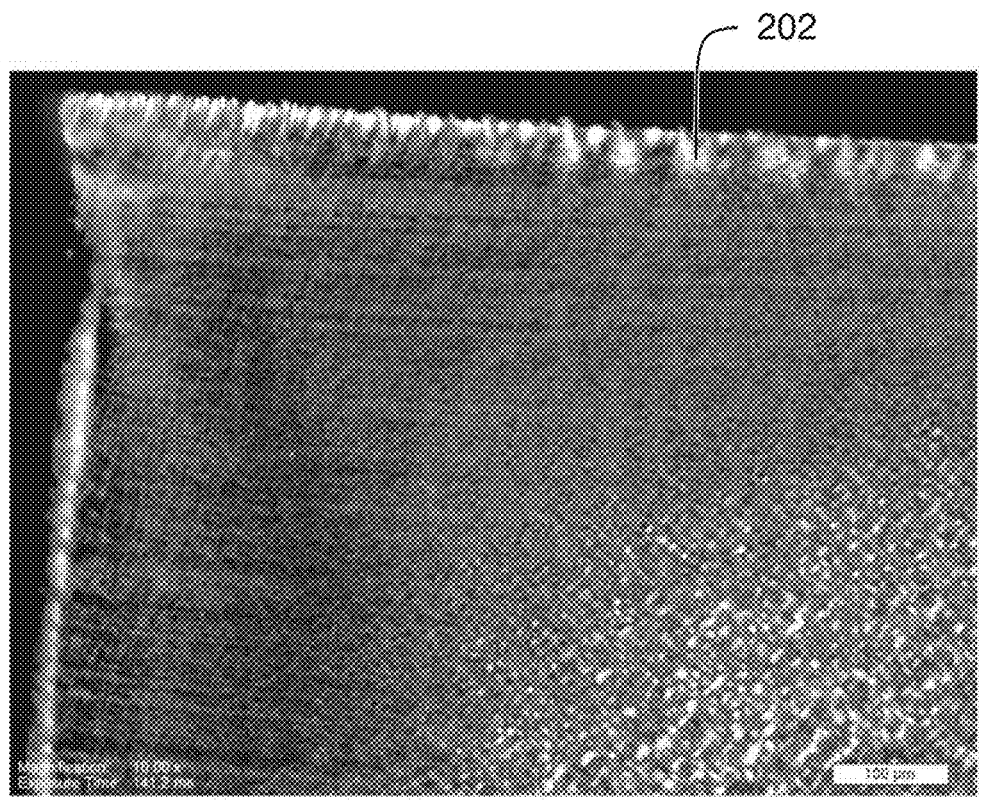
FIG. 12 is a micrograph of the edge of a tensile bar according to FIG. 2, for SBL.
Figure 13:
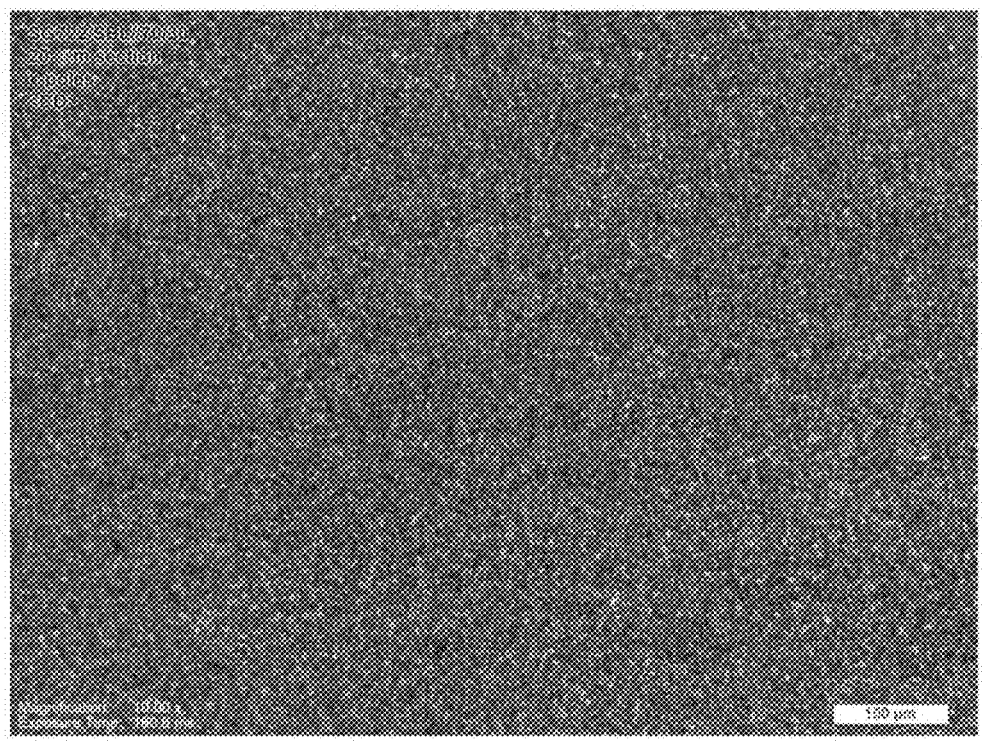
FIG. 13 is a micrograph of a tensile bar according to FIG. 2, for virgin polymer.
Figure 14:
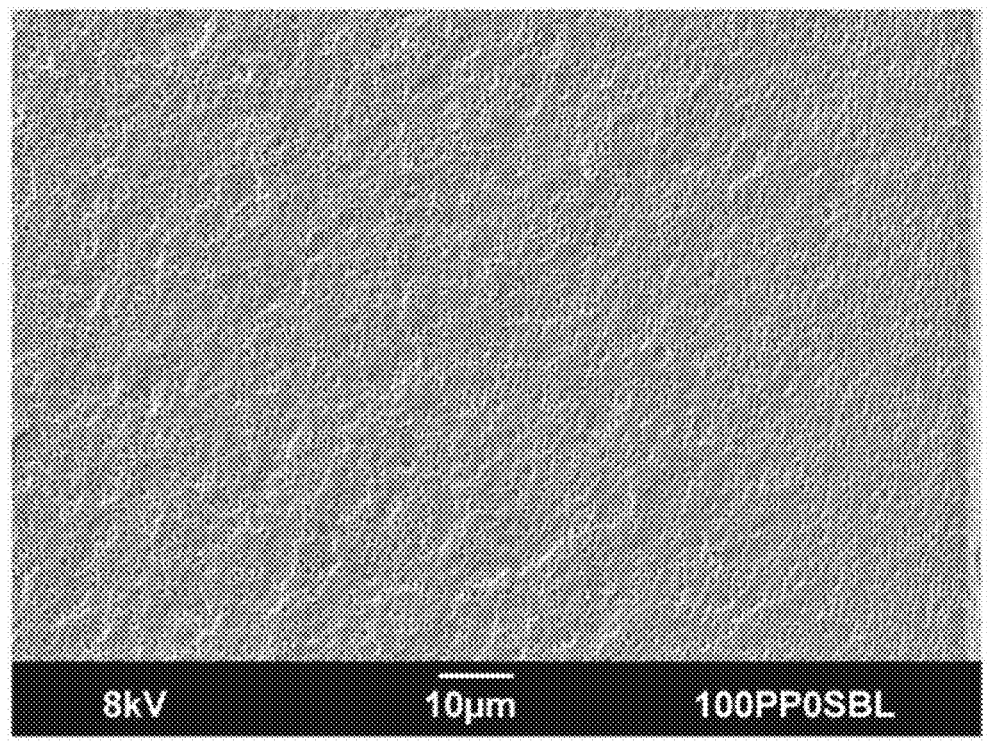
FIG. 14 is a micrograph of an etched surface of a tensile bar according to FIG. 2, showing the topography of a virgin polymer.
Figure 15:
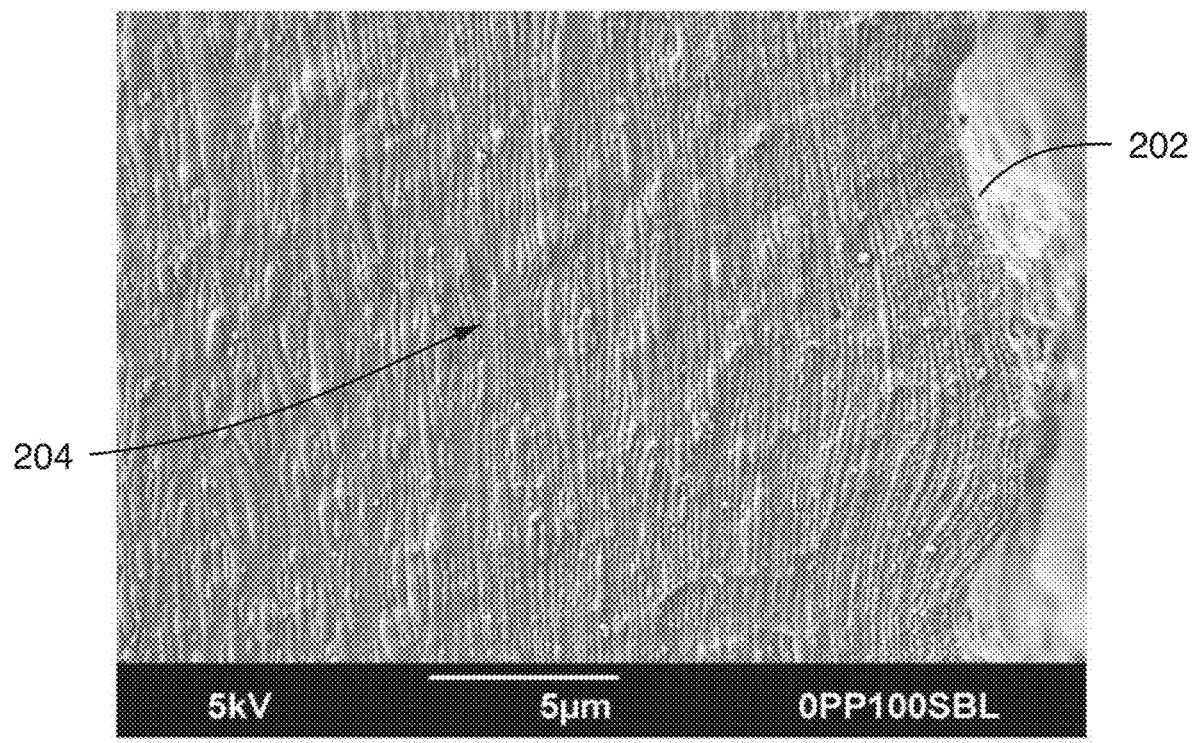
FIG. 15 is a micrograph of an etched surface of a tensile bar according to FIG. 2, showing the topography of SBL.
Figure 16:
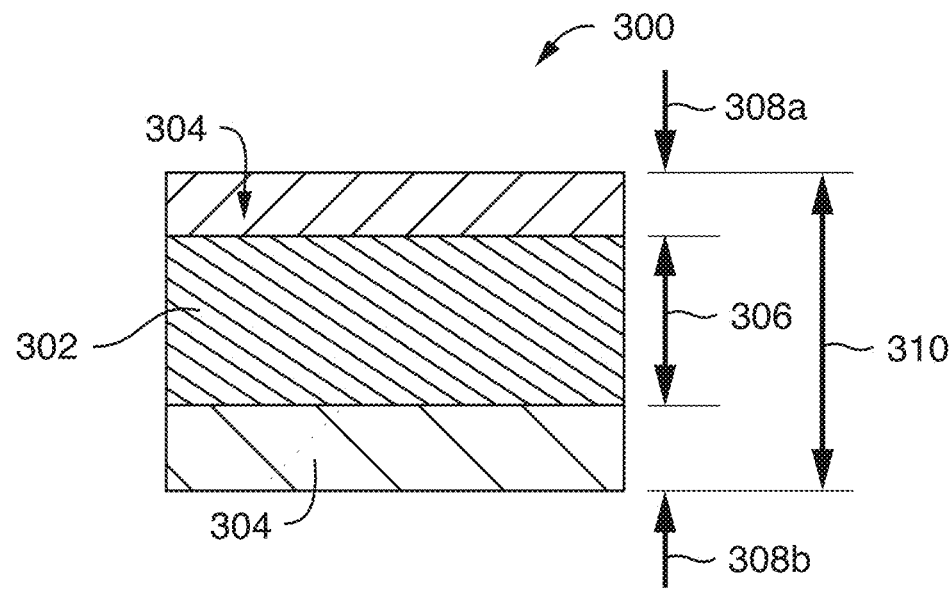
FIG. 16 is one embodiment of a wet wipe package that is injection molded from the material of the present disclosure.
Figure 17:
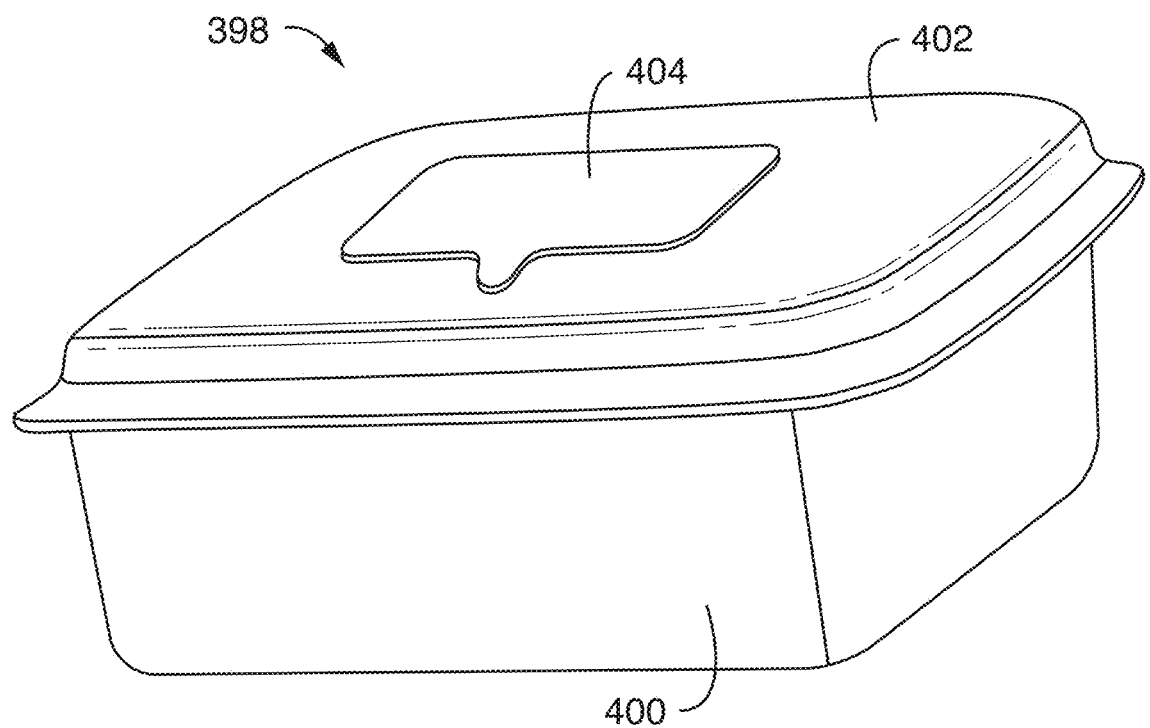
FIG. 17 is one embodiment of the material the may be used to manufacture the wet wipe package of FIG. 16.

FIG. 5 shows a plot of strain at break of the samples as a function of composition. The straight line is expected behavior based on a mixture rule. All three blends had strain-at-failure data above the straight line, clearly demonstrating that the strain at break has a synergistic effect. This is an unexpected result.

TABLE 2

| Samples | Tensile Strength (MPa) | Strain-at-failure (%) | Modulus (MPa) | Strain @ yield (%) |
|---|---|---|---|---|
| Comparative Example 1 100% PP | 20 MPa | 104% | 1259 MPa | 4% |
| Comparative Example 2 100% SBL | 22 MPa | 127% | 1240 MPa | 4% |
| Example 4 PP/SBL 70/30 | 20 MPa | 136% | 1357 MPa | 4% |
| Example 5 PP/SBL 50/50 | 20 MPa | 132% | 1294 MPa | 4% |
| Example 6 PP/SBL 30/70 | 20 MPa | 134% | 1246 MPa | 4% |

The present disclosure has been described in general and in detail by means of examples. Persons of skill in the art understand that the disclosure is not limited necessarily to the embodiments specifically disclosed, but that modifications and variations may be made without departing from the scope of the disclosure as defined by the following claims or their equivalents, including other equivalent components presently known, or to be developed, which may be used within the scope of the present disclosure. Therefore, unless changes otherwise depart from the scope of the disclosure, the changes should be construed as being included herein.

We claim:
1. A thermoplastic material comprising:
   30 to 70 parts by weight of 100% virgin polymer selected from the group consisting of polypropylene, polyethylene, polystyrene, acrylonitrile-butadiene-styrene copolymers, polylactic acid, blends of polylactic acid and polyolefins and combinations thereof; and
   the remaining parts by weight of a post-industrial-recycled material (PIR), wherein the PIR comprises a spun-bonded laminate comprising a thermoplastic polyolefin elastomer and a spunbonded fiber layer or an adhesive spun-bond film laminate comprising a polyolefin film layer and a spunbonded fiber layer.
2. The material of claim 1 wherein the PIR comprises a styrenic, thermoplastic, block-copolymer.
3. The material of claim 1 having a 2 ft-lb hammer capacity impact-strength between 10 and 11 ft-lb/in, according to an Izod Impact Strength Test Method described herein.
4. The material of claim 1 wherein the 100% virgin polymer has a 2 ft-lb hammer capacity impact-strength between 10 and 11 ft-lb/in, according to an Izod Impact Strength Test Method described herein.
5. The material of claim 1 having a constant strain at yield.
6. The material of claim 1 wherein the virgin polymer is polypropylene.
7. A thermoplastic extruded article comprising:
   a core layer of material, the core layer comprising 30 to 70 parts by weight of 100% virgin polymer selected from the group consisting of polypropylene, polyethylene, polystyrene, acrylonitrile-butadiene-styrene copolymers, polylactic acid, blends of polylactic acid and polyolefins and combinations thereof; and
   the remaining parts by weight of a post-industrial-recycled material (PIR), wherein the PIR comprises a spun-bonded laminate comprising a thermoplastic polyolefin elastomer and a spunbonded fiber layer or an adhesive spun-bond film laminate comprising a polyolefin film layer and a spunbonded fiber layer.
8. The article of claim 7, wherein the article is a package for wet wipes.

9. The article of claim 7, further comprising two skin layers comprised of at least one virgin polymer, wherein the core layer is sandwiched between the two skin layers, and wherein the core layer and the skin layers together define an article thickness.

10. The article of claim 9, wherein the layer of material comprises 51% to 90% of the article thickness, and the two skin layers each comprise 5% to 24.5% of the article thickness.

11. The article of claim 7, wherein the core layer is formed by melt processing the virgin polymer and PIR at temperatures ranging from 160° C. to 240° C.

12. A thermoplastic material comprising:
   30 to 70 parts by weight of 100% virgin polymer selected from the group consisting of polypropylene, polyethylene, polystyrene, acrylonitrile-butadiene-styrene copolymers, polylactic acid, blends of polylactic acid and polyolefins and combinations thereof; and
   the remaining parts by weight of a post-industrial-recycled material (PIR), wherein the PIR comprises a spun-bonded laminate comprising a thermoplastic polyolefin elastomer and a gatherable fiber layer or an adhesive spun-bond film laminate comprising a polyolefin film layer and a nonwoven facing.

13. The material of claim 12, wherein the PIR comprises a styrenic, thermoplastic, block-copolymer.

14. The material of claim 12 having a 2 ft-lb hammer capacity impact-strength between 10 and 11 ft-lb/in, according to an Izod Impact Strength Test Method described herein.

15. The material of claim 12, wherein the 100% virgin polymer has a 2 ft-lb hammer capacity impact-strength between 10 and 11 ft-lb/in, according to an Izod Impact Strength Test Method described herein.

16. The material of claim 12 having a constant strain at yield.

17. The material of claim 12, wherein the virgin polymer is polypropylene.

* * * * *